INVENTOR.
Lloyd T. Fuqua
BY
Hugh L. Fisher
ATTORNEY

United States Patent Office 3,321,994
Patented May 30, 1967

3,321,994
DIRECTION SIGNAL ACTUATING
MECHANISM
Lloyd T. Fuqua, Fortville, Ind., assignor to General
Motors Corporation, Detroit, Mich., a corporation of
Delaware
Filed Dec. 29, 1964, Ser. No. 421,923
5 Claims. (Cl. 74—519)

This invention relates to direction signaling apparatus and more particularly to a self-canceling direction signaling mechanism incorporating a braking feature for preventing overcancellation of the mechanism.

In semi-automatic direction signaling mechanisms wherein the mechanism is adjusted manually by the vehicle driver to turn indicating positions, the restoration of the mechanism to its inactive condition is usually accomplished by means of a cam device which is movable in response to rotation of the vehicle steering wheel so as to shift the signaling mechanism from an active to an inactive or neutral position. It has been found that the actuating mechanism frequently overtravels its neutral position because of the speed of rotation of the steering wheel and the inertia of the mechanism upon rotation of the steering wheel toward a position for straight ahead travel of the vehicle. Such a condition of operation is undesirable since it requires the attention of the operator to reset the device manually.

While this problem has caused some concern in the past, mechanisms of more recent vintage which are constructed of molded plastic materials increase the probability of overcancellation since the plastic materials have a low coefficient of friction and relative movement between the parts is therefore much easier.

The disadvantage of overcancellation has been substantially eliminated in the present invention by providing a direction signaling mechanism wherein a resilient O-ring of elastomeric material is provided in the pivotal bearing between the movable actuator member and the stationary support member so as to provide a controlled friction during automatic cancellation.

A more complete understanding of the present invention may be had from the following detailed description which should be read in conjunction with the drawings in which.

Figure 1:
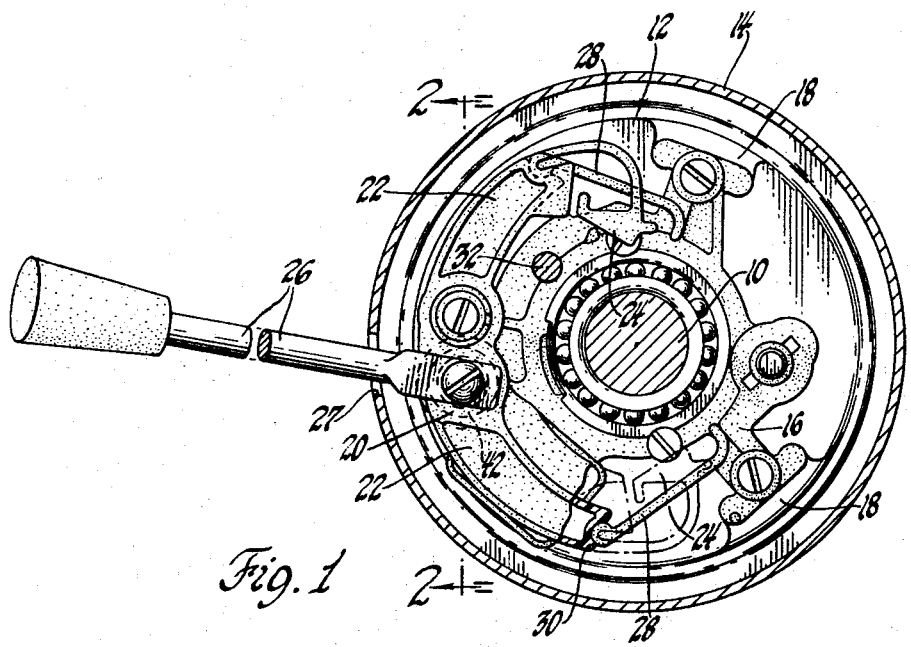
FIGURE 1 is a view partly in elevation and partly in section of apparatus constructed in accordance with the present invention with certain parts being broken away for clarification.

Referring now to the drawings, and initially to FIGURE 1, there is shown a directional signal mechanism constructed in accordance with a preferred embodiment of the present invention and is adapted for use in conjunction with a motor vehicle having a steering mechanism including a rotatable steering post 10 connected at one end to a steering wheel (not shown) and at its other end to apparatus for effecting turning of the front wheels of the vehicle.

The direction signaling mechanism is generally designated 12 and is housed within a steering column 14. The mechanism 12 includes a support member 16 secured to inwardly extending bosses 18 of the steering column 14. The support member 16 supports a movable actuator member 20 which includes a body portion 22 terminating in integral flexible pawls 24. The support member 16 and the actuator member 20 are molded from a resilient plastic material. One such material is an acetal resin of composition $(-OCH_2-)n$ derived by polymerization of formaldehyde. The actuator member 20 is adapted to be rocked from a neutral position shown in FIGURE 1 to a left or right turn indicating position by a lever 26 secured to the body portion and extending through an opening 27 in the steering column 14. Flexible detent posts 28 extend from the support member 16 and are located so that when the parts are assembled, the posts 28 bear snugly against an extension 30 of the actuator member 20. When the lever 26 is operated to shift the actuator member 20 to a turn indicating position, the detent posts 28 are flexed outwardly and yieldably hold the actuator member in its turn indicating position.

Canceling means, as shown in FIGURE 1, take the form of a pin 32 which extends from the steering wheel (not shown) and moves in an orbital path to engage the pawls 24 to return the actuator member 20 to a neutral position upon completion of a turn. It will be understood that various other types of canceling means may be utilized; for example, one or more cams may be carrier by the steering post and project radially therefrom.

Figure 2:
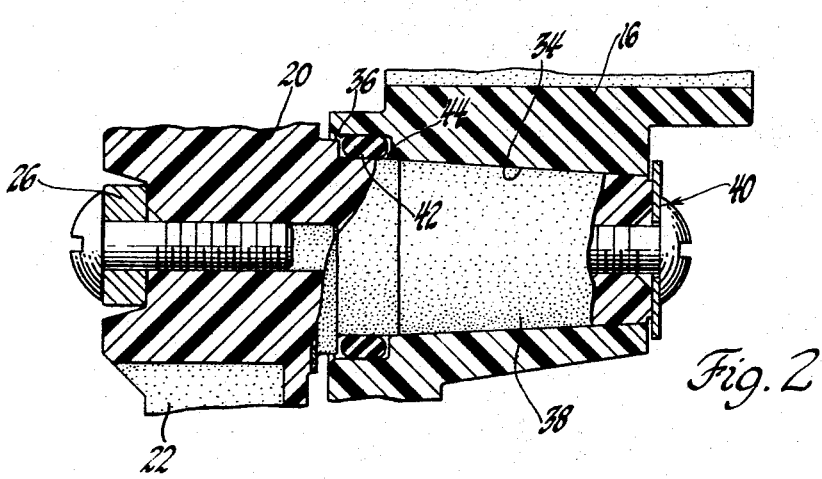
FIGURE 2 is an enlarged sectional view taken along lines 2—2 of FIGURE 1.
Figure 3:
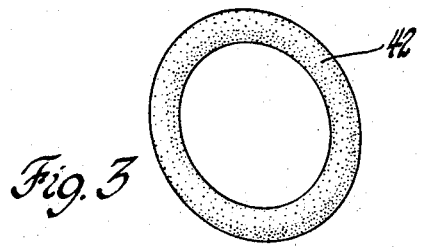
FIGURE 3 is a perspective view of the O-ring used in the present invention.

The manner in which the actuator member 20 is mounted to the support member 16 is best shown in FIGURE 2. The support member 16 is provided with a tapered bore 34 and a counterbore 36. The actuator member 20 is provided with an integrally formed transversely extending hub portion 38 which is received by the bore 34 and is secured against movement in a vertical plane by the screw and washer assembly 40. A resilient O-ring 42 formed of an elastomeric material having a relatively high coefficient of friction surrounds the hub portion 38 and is compressed between the upper surface 44 and the inner surface of the counterbore 36. Thus during pivoting or rocking of the actuator member 20 to a turn indicating position and upon return of the actuator member to a neutral position through engagement of the canceling pin 32 with either of the pawls 26 a braking friction is applied to the relatively movable portions of the actuator member and the support member 16 and is not limited to their contacting surfaces, which as previously mentioned, have a relatively low coefficient of friction, but rather is controlled by the higher friction surfaces of the O-ring 42.

It will be apparent from the above that the present invention provides an inexpensive and easily assembled direction signaling mechanism which effectively eliminates the undesirable overcancellation inherent in the prior art mechanisms.

While the invention has been described with regard to a preferred embodiment thereof, this should not be construed in a limiting sense. Modifications and variations thereof will now appear to those skilled in the art. For a definition of the invention, reference is made to the appended claims.

I claim:
1. Semi-automatic direction signaling apparatus for use in a motor vehicle having a steering shaft and cam means movable with said shaft, said apparatus comprising an actuator member including a transversely extending hub portion, a support member including a bore and a counterbore, said hub portion extending into said bore, said actuator member and said support member being formed of a material having a relatively low coefficient of friction, a resilient elastomeric member having a relatively high coefficient of friction surrounding said hub portion and being compressed between said hub portion and said counterbore to provide a controlled friction between the surfaces of said hub portion and said counterbore during relative movement thereof, said actuator member including a body portion terminating at its end in integral flexible pawls and means connected to said actuator mem- ber for moving said pawls into the path of travel of said cam means.

2. In a motor vehicle having a steering shaft and canceling means movable in an orbital path with said shaft, a direction signaling mechanism comprising a molded support member, a molded actuator member having a body portion including a transversely extending hub portion and terminating in flexible pawls adapted to project toward the path of movement of said camming means, said support member including a tapered bore and counterbore for receiving said hub portion for mounting said actuator member for rocking movement from a neutral position to operating position on opposite sides of said neutral position, a rubber O-ring surrounding said hub portion and seated in said counterbore, said O-ring being compressed by engagement with said support member and said hub portion to provide a controlled friction surface between said members.

3. The mechanism set forth in claim 2 wherein said support member and said actuator member are formed of a plastic material having a relatively low coefficient of friction.

4. A direction signaling mechanism for use with cam means movable in an orbital path, said mechanism comprising a support member and an actuating member, each of said members being provided with cooperating portions forming a bearing permitting movement of said actuating member from a neutral position to operating positions on opposite sides of said neutral position, said actuating member being provided with cancelling means adapted to cooperate with said cam means for returning said actuating member to said neutral position from either of said operating positions, a resilient elastomeric element having a coefficient of friction which is greater than the coefficient of friction of the material forming said cooperating portions and extending between the surfaces of said portions to prevent over-cancellation of said mechanism.

5. The mechanism set forth in claim 4 wherein said cooperating portions comprise an integrally formed hub portion extending from said actuating member and a bore and counterbore formed in said support member for receiving said hub portion, said elastomeric elements comprising a rubber O-ring surrounding said hub portion and seated in said counterbore.

References Cited

UNITED STATES PATENTS

| | | | |
|---|---|---|---|
| 2,817,728 | 12/1957 | Gurney | 200—61.27 |
| 2,942,901 | 6/1960 | Booth | 287—90 |
| 3,139,311 | 6/1964 | Melton et al. | 308—238 |
| 3,149,863 | 9/1964 | Melton et al. | 287—90 |

FOREIGN PATENTS

| | | |
|---|---|---|
| 648,547 | 1/1951 | Great Britain. |

FRED C. MATTERN, Jr., *Primary Examiner.*

W. S. RATLIFF, *Assistant Examiner.*